April 24, 1945.   J. B. QUINN   2,374,306
AIRCRAFT LANDING APPARATUS
Filed Nov. 24, 1941
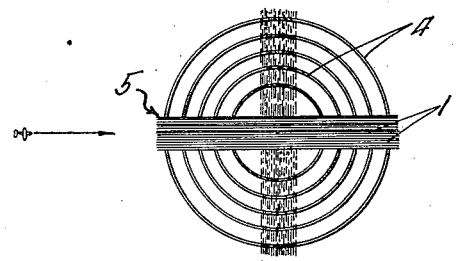
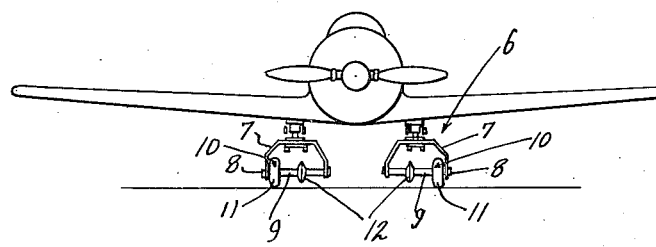
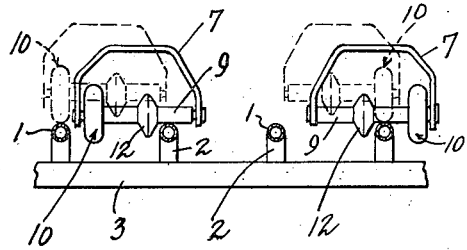 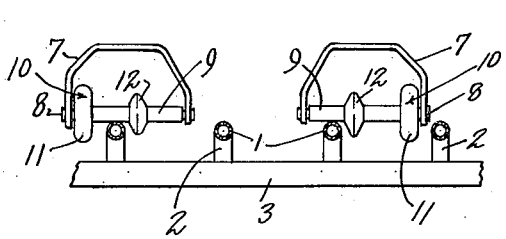
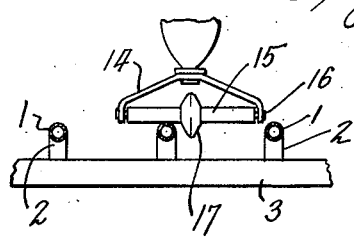
Inventor
John B. Quinn
By Lyon & Lyon
Attorneys Patented Apr. 24, 1945

2,374,306

UNITED STATES PATENT OFFICE 2,374,306

AIRCRAFT LANDING APPARATUS

John B. Quinn, West Los Angeles, Calif.

Application November 24, 1941, Serial No. 420,171

6 Claims. (Cl. 244—103)

This invention relates to aircraft landing apparatus, and more particularly to the cooperating construction of a landing surface and gear for the landing and take-off of aircraft.

In the landing of aircraft at the present time it is common to employ large or long flat runways operating in conjunction with landing gears composed of wheels and such landing gear is now of the form commonly referred to as of the tricycle type. The difficulties encountered with this type of landing equipment is that there is nothing to prevent side-slip or drift of an aircraft in landing, and also that it requires a very large surface to enable an aircraft, particularly of the heavier-than-air variety, to come into the wind in landing. In a stationary airfield it is therefore necessary to provide a multiplicity of runways such as will permit landing on one of the runways which will be directed into the wind. In the landing of aircraft on ship decks it is also very difficult and expensive to construct landing surfaces. Such landing surfaces impose upon the ship tremendous loads, very often necessitating the extensive weighting of the keel of the ship in order to prevent rolling thereof and as such surfaces are solid surfaces, it is required that such elevated surfaces be raised above the deck of the ship sufficient to avoid possibility of the same being washed over during bad weather.

It is therefore an object of this invention to provide a landing surface and cooperating landing gear which will overcome the difficulty now encountered through the use of such flat landing fields, planes or surfaces when utilized in connection with the customary type of landing gear ordinarily composed of two or three rubber-tire landing wheels.

Another object of this invention is to provide a cooperating landing apparatus for landing of aircraft, particularly of the heavier-than-air type, wherein the landing field is composed of a multiplicity of spaced structural pipes adapted to cooperate with a landing gear composed of flanged guide wheels whereby side-slip of the aircraft in landing is avoided and wherein the structure of the landing surface is greatly reduced in weight and in details of construction, enabling the construction of the landing surface at a very reduced cost.

Another object of this invention is to produce a cooperating landing structure composed of a landing surface made up of a multiplicity of elongated spaced pipes adapted to cooperate with flanged guide wheels of the landing gear of an aircraft and wherein means are provided for insuring that the length of the landing surface so constructed is, or may be, properly directed into the wind.

Another object of this invention is to provide a cooperating landing structure and landing means composed of a multiplicity of elongated spaced structural members and a cooperating landing gear in which a definite relationship is maintained between the spacing of the structural landing members and the elements of the landing gear to maintain stability of the aircraft in landing.

Other objects and advantages of this invention it is believed will be apparent from the following detailed description of a preferred embodiment thereof as illustrated in the accompanying drawing.

In the drawing:

Figure 1 is a plan view partially broken away of a landing surface embodying my invention and illustrating the same as mounted in such manner as to permit its greatest length to be directed into the wind.

Figure 2 is a diagrammatic view of an aircraft with landing gear structure adapted to cooperate with the landing surface.

Figure 3 is a fragmental sectional view through the landing surface structure illustrating a landing gear as in one position thereon.

Figure 4 is a view similar to Figure 3 illustrating the other position of landing with relation to the spaced landing surface members.

Figure 5 is a rear elevation illustrating the rear fuselage or tail skid or support with relation to the landing structure.

While my invention is applicable for use under many conditions and is particularly applicable for the formation of a landing field on a ship deck or upon islands, over cities, as on building tops, or the like, I have herein diagrammatically illustrated the same as for general use wherein the structure forming the landing runway is mounted so that it may be rotated into any desired position.

As herein illustrated, the landing runway is formed of a multiplicity of parallel spaced structural members or pipes 1 supported at spaced points along their length on standards 2 from a suitable structural frame 3. As illustrated, the structural frame 3 is mounted upon tracks 4 forming in effect a turntable so that through the use of any suitable or desirable mechanism, the landing runway 5 may be rotated into the wind.

In the preferred form of landing runway I prefer to employ pipes or cylindrical members mounted in spaced relationship to form the landing runway. I prefer to utilize such pipe as, for example, seamless pipe or tubing because the cylindrical structure offers the greatest resistance to the different forces encountered in the landing of an aircraft thereon. The sections of pipe 1 are connected in any suitable manner as, for example, through the use of connecting members or by welding. The lateral spacing of the pipes 1 is determined by the landing gear of the aircraft which in this case is indicated as of universal use permitting landing of the aircraft either upon the runway 5 or upon any plane surface.

Any suitable form of landing gear may be employed, being preferably of the retractable type as is generally indicated diagrammatically at 6. In the form of structure which I have illustrated, the landing gear includes a pair of forks 7 in which axles 8 are mounted and upon which axles 8 there is mounted an assembly including a spool 9 upon which there is formed a wheel 10 which may receive pneumatic tires 11. Also formed upon the spools 9 are guide flanges 12, the size and spacings of which is related to the size and spacing of the pipes 1. It is preferable that the diameter of the flanges be such that when the aircraft is landed upon the spools 9 that the flanges 12 extend beyond the center of the pipes 1.

As illustrated, the wheels 10 and flanges 12 may be formed integral with the spools 9 or may be suitably attached thereto. The two spaced forks 7 carrying the wheels 10 and flanges 12 are preferably so supported from the wings or fuselage of the aircraft as to maintain the hereinafter set forth relationship. As illustrated, the two wheels 10 are supported in spaced relationship corresponding with the spacing of four structural members or pipes 1, that is, the spacing of the centers of the said wheels 10 corresponds with the spacing of the centers of the structural members or pipes 1. The spacing of the flanges 12, that is, the distance between their centers, is made to correspond with the spacing apart of the centers of three such structural members or pipes 1. As will be viewed from Figures 3 and 4, this spacing permits of the landing in two positions, both of which correspond but are opposite in their relationship. In Figure 3 it will be noted that one such pipe 1 is located between a wheel 10 and its accompanying flange 12 while on the opposite fork 7 this landing structure engages one of the structural members or pipes 1 on the inside of the corresponding flange 12 of that landing structure.

In Figure 4 it will be noted that the landing relationship is reversed in position. It will also be noted from the dotted lines in Figure 3 that inasmuch as the wheels 10 are spaced apart a distance corresponding to the spacing of four structural members or pipes 1, that it is possible for the wheels 10 to contact the surface of the structural members or pipes 1 at the instant of landing. This would result in a sidewise motion of the aircraft until the landing structure contacts the structural members or pipes 1 in either of the positions indicated in Figures 3 or 4.

It will also be apparent from the foregoing that it is possible for the aircraft to contact the landing structure formed by the structural members or pipes 1 with the flanges 12 engaging the surfaces of two structural members or pipes 1 spaced apart a distance corresponding with the flange spacing, in which event the slight lateral movement of the aircraft would occur until the aircraft had landed in the position indicated in either Figures 3 or 4.

When the aircraft had landed upon the surface as indicated in either Figures 3 or 4, further side movement of the aircraft is prevented by the flanges 12 and wheels 10 engaging the sides of the structural members or pipes 1. This prevents side slip of the aircraft as it is then definitely guided in landing.

In the form of landing structure illustrated, I have also shown the same as including a tail skid 14 also of formed construction and having a spool 15 mounted upon the axle 16. The spool 15 is formed with a flange 17 similar to the flanges 12 and the spool 15 is of a width greater than the spacing of the pipes 1 insuring a landing surface no matter in what position the aircraft lands upon the pipes 1.

While I have heretofore set forth one particular relationship of spacing of the landing field members and the landing gear, it will be apparent that other relationships may be also established. The important point to avoid, however, is such spacing as would permit one of the landing gear carried by one fork 7 being unsupported at any instant during landing as in this latter case the aircraft might easily tip over.

It will be apparent from the drawing that the distance between the centers of the flanges 12 and wheels 10 is equal to approximately one-half the spacing of the structural members or pipes 1, this in order to maintain the hereinabove set forth relationship between the landing gear and the landing surface provided by the structural members or pipes 1.

While I have herein illustrated the landing gears as carrying wheels 10 and flanges 12, it will be apparent that two spaced guide flanges might be employed with equal facility, particularly where the plane was particularly adapted for landing upon surfaces like that provided by the spaced apart structural members 1. The only utility in using the wheels 10 is that it permits the aircraft to land upon an ordinary flat surface. As illustrated, the wheels 10 may be considered as providing second spaced guide members or flanges.

Having fully described my invention, it is to be understood that I do not wish to be limited to the details herein set forth, but my invention is of the full scope of the appended claims.

I claim:

1. In an aircraft landing apparatus, the combination of a multiplicity of elongated spaced structural supporting members, an aircraft landing gear having rotatably mounted elongated landing spools formed of a length corresponding substantially with the spacing of the supporting members, and said spools being spaced apart a distance greater than the spacing of the supporting members, and guide flanges carried by the spools.

2. In an aircraft landing apparatus, the combination of a multiplicity of spaced apart structural guide members, landing gears having spaced apart rotatably mounted landing spools the length of which are approximately equal to the spacing of the structural members, and said spools having spaced apart circular guide members carried thereby.

3. In an aircraft landing apparatus, the combination of a multiplicity of spaced apart structural guide members, landing gears having spaced apart rotatably mounted landing spools the length of which are substantially equal to the spacing of the structural guide members, said spools having spaced apart circular guide members carried thereby, the spaced apart guide members including wheels and guide flanges, and being spaced apart a distance greater than the width of the structural guide members.

4. In an aircraft landing apparatus, the combination of a multiplicity of elongated spaced parallel structural supporting members, an aircraft landing gear including a pair of spaced supporting members, each of which includes a pair of spaced apart rotatably supported guide flanges wherein the distance between the outer guide flanges corresponds to the spacing of a number of the parallel supporting members, and the spacing of the inner guide flanges corresponds to the spacing of a different number of the parallel structural supporting members.

5. In an aircraft landing apparatus, the combination of a multiplicity of elongated spaced parallel structural supporting members, an aircraft landing gear including a pair of spaced landing members each of which landing members includes a pair of spaced apart rotatably supported guide members, and wherein the distance between the outer guide members corresponds to the spacing of four parallel supporting members, and the spacing of the inner guide flanges corresponds to the spacing of three parallel supporting members.

6. In an aircraft landing apparatus, the combination of a multiplicity of elongated spaced parallel supporting pipes, an aircraft landing gear including a pair of spaced landing members, each of which landing members includes a pair of spaced apart rotatably supported guide flanges, and wherein the distance between the outer guide flanges corresponds to the spacing from center to center of a number of the parallel supporting pipes, and the spacing of the inner guide flanges corresponds to the spacing of a different number of parallel supporting pipes.

JOHN B. QUINN.